United States Patent [19]
Erikson et al.

[11] Patent Number: 5,253,125
[45] Date of Patent: Oct. 12, 1993

[54] METHOD AND APPARATUS FOR DATA FILL IN FAILING READ CHANNEL IN PARALLEL TRANSFER DRIVES

[75] Inventors: Wallace J. Erikson, Eden Prairie; Edward L. Grivna, Brooklyn Park; Herman T. Todd, South St. Paul, all of Minn.

[73] Assignee: Seagate Technology, Inc., Scotts Valley, Calif.

[21] Appl. No.: 6,180

[22] Filed: Jan. 19, 1993

Related U.S. Application Data

[63] Continuation of Ser. No. 456,117, Dec. 22, 1989, abandoned.

[51] Int. Cl.⁵ ............................................. G11B 5/09
[52] U.S. Cl. ....................................... 360/51; 360/53
[58] Field of Search ............... 360/46, 51, 53; 369/47, 369/48, 59; 371/6, 7, 47.1

[56] References Cited

U.S. PATENT DOCUMENTS 4,040,022  8/1977  Takii ..................................... 360/51
4,209,809  6/1980  Chang et al. .......................... 360/53

Primary Examiner—Donald T. Hajec
Assistant Examiner—Won Tae C. Kim
Attorney, Agent, or Firm—Kinney & Lange

[57] ABSTRACT

In a multiple platter parallel transfer disk drive tolerant of a fault on one channel, data bytes and accompanying parity data are stored to different platters, corresponding with the different channels, of the parallel transfer disk drive. Failure of a channel results in substitution of a predetermined data stream in the channel for the lost data. Data stream substitution is initiated whenever the clock for the channel is not detected within a certain maximum period. Data regeneration is effected from parity data generated for the data prior to storage.

7 Claims, 3 Drawing Sheets

METHOD AND APPARATUS FOR DATA FILL IN FAILING READ CHANNEL IN PARALLEL TRANSFER DRIVES

This is a continuation of application Ser. No. 07/456,117 filed on Dec. 22, 1989, abandoned as of the date of this application.

BACKGROUND OF THE INVENTION

The present invention relates to data transfer from parallel transfer disk drives and more particularly to a method of and apparatus for reading data from parallel transfer disk drives notwithstanding a fault occurring in a data transmission channel.

Parallel transfer disk drives comprise a plurality of disk platters stacked to rotate as a single unit on a spindle. Each platter has top and bottom surfaces covered with a magnetically polarizable media. A magnetic transducer associated with each magnetic media surface is used to write and read data records (i.e. generate and detect associated groups of magnetically polarized regions) on the surfaces.

The transducer and the magnetic media for each platter present to one another surfaces that are in essentially constant motion with respect to one another. While the interaction between transducer and media is magnetic, the interaction between their surfaces is a mechanical one, affected over time by factors such as friction, wear, media oxide flaking and collisions between the transducer and the media. In addition, both individual transducers and magnetic media surfaces are subject to failures, such as opening of a transducer electromagnet winding. Such mechanical changes affect the magnetic interaction of the transducer and the media, and consequently can affect the ability of data recovery circuitry to read data records from the media surface. All of these faults can result in partial loss of access to data records from the affected disk drive.

Data recovery circuitry is associated with each magnetic transducer for reading the records. While the operation of such circuitry is not strictly related to the invention of this patent, knowledge of certain characteristics of the interaction of these circuits with the data records is useful to understanding the invention.

Intelligence, in data records, is associated with the relative timings between transitions in the polarization states of sets of magnetically polarized regions on a magnetic media surface. To the data recovery circuitry, these transitions appear as transitions in the voltage level of an electrical signal. At least in theory, the meaning of the data record will remain the same regardless of the speed at which the platter it is located on is moving relative to the transducer, so long as the speed is constant. The clock of a data record is recovered from the data record itself. Accordingly, each data record includes a field near its beginning from which the clock of the signal is established. If the data recovery circuitry can recover the clock, recovery of the data can proceed. Where the data recovery circuitry fails to recover the clock, probably as a result of one of the faults described above, data recovery on that channel cannot successfully proceed.

Parallel transfer disk drives achieve high rates of data transfer by the simultaneous transfer of data bytes over a plurality of channels to and from the plurality of available magnetic media surfaces. In conventional drives, data is recovered serially. The magnetic transducers are supported by a carriage providing for movement of the transducers in unison. Data records are positioned in a plurality of concentric circular tracks, which are located on each magnetic media surface. The carriage positions the magnetic transducing heads over the same concentric track on each platter, allowing reading and writing of data records at the same address on each platter at substantially the same instant.

Current multiplatter disk drives abort a data recovery operation whenever one of the channels fail in a data recovery attempt. Failures of multiplatter disk drives are more common than failures of single platter disk drives as a result of the increased number of transducers and magnetic media surfaces which are interacting.

Avoidance of an abort in a data read resulting from loss of a channel requires, at a minimum, a data recovery system allowing regeneration of the data of the lost channel. Otherwise, continuation of the read would be futile. Schemes for data recovery systems applicable to parallel transfer drives exist. Data in digital processing systems is typically organized into groups of adjacent bits acted upon by system as a unit. Such units (or "bytes" as they are commonly called) are stored to the disk drive by assigning each bit of the byte to the same logical address on different platters (different transducers). In other words, each logically associated byte is divided among a plurality of physically associated data records. Allowance for loss of the data from a record can be provided through use of redundant data for regeneration of the record.

Examples of redundant data include parity data and error correction code syndromes generated from a logically associated group of data bits, such as a byte. The redundant data for a byte can be generated upon transfer of the byte to the disk drive for storage. The redundant data can then be stored in some fashion which preserves its relationship with the data group for which it was generated.

SUMMARY OF THE INVENTION

The present invention relates to a multiple platter parallel transfer disk drive tolerant of a fault in one channel. Data bytes and accompanying parity data are stored to different platters, corresponding with the different channels, of the parallel transfer disk drive. Failure of a channel results in substitution of a predetermined data stream in the channel for the lost data. Data stream substitution is initiated whenever recovery of the clock for the channel is not ascertained within a certain maximum period at the beginning of a read cycle. Data regeneration is effected through parity data generated for the data prior to storage. Data regeneration for the lost channel can be executed by an interface/controller between the disk drive and a host data processing system or by the host data processing system. Data regeneration is effected from parity data generated for the data prior to storage.

Each channel of the parallel transfer disk drive has an independent clock recovery and data read circuit, which operates to recover the clock signal for data records on each magnetic media surface. A window generator indicates a predetermined maximum time period for recovery of the clock signals. An N-1 detect or voter circuit monitors the data recovery circuitry and the clock window circuit to determine the channels not available at the moment of expiration of the window. Failure to recover the clock for one channel within the period results in a preset data stream being inserted into the channel as a substitute for the absent data. Data insertion allows the system to continue its data read operation. The parity data, in combination with the original data from the available channels, can then be used to regenerate the data stored to the unavailable platter. Failure of two or more channels results in the interface aborting a read operation.

DETAILED DESCRIPTION OF THE PREFERRED EMBODIMENT

Figure 1:
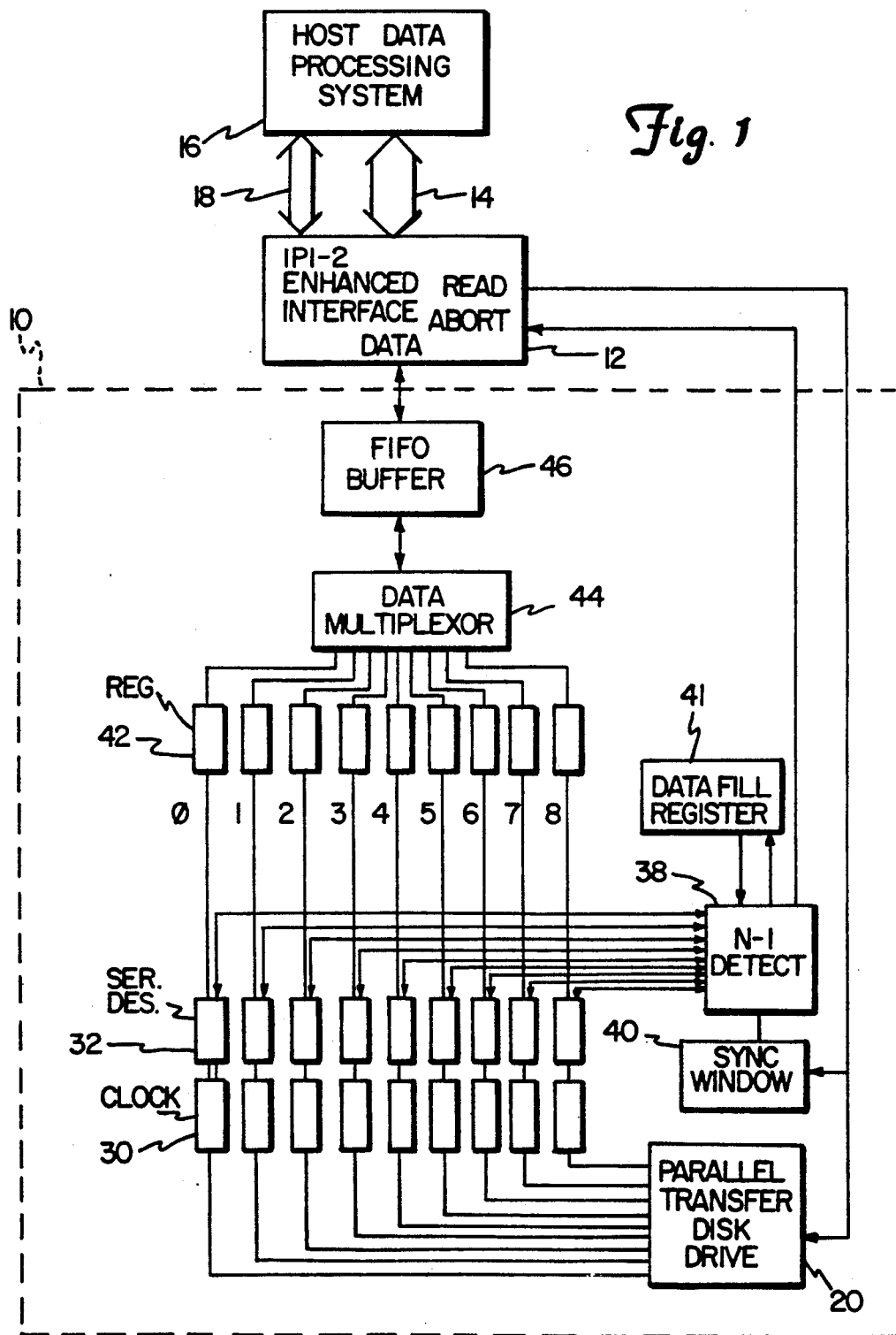
FIG. 1 is a block diagram of multiple channel data read circuit for a multiple platter parallel transfer disk drive.
Figure 2:
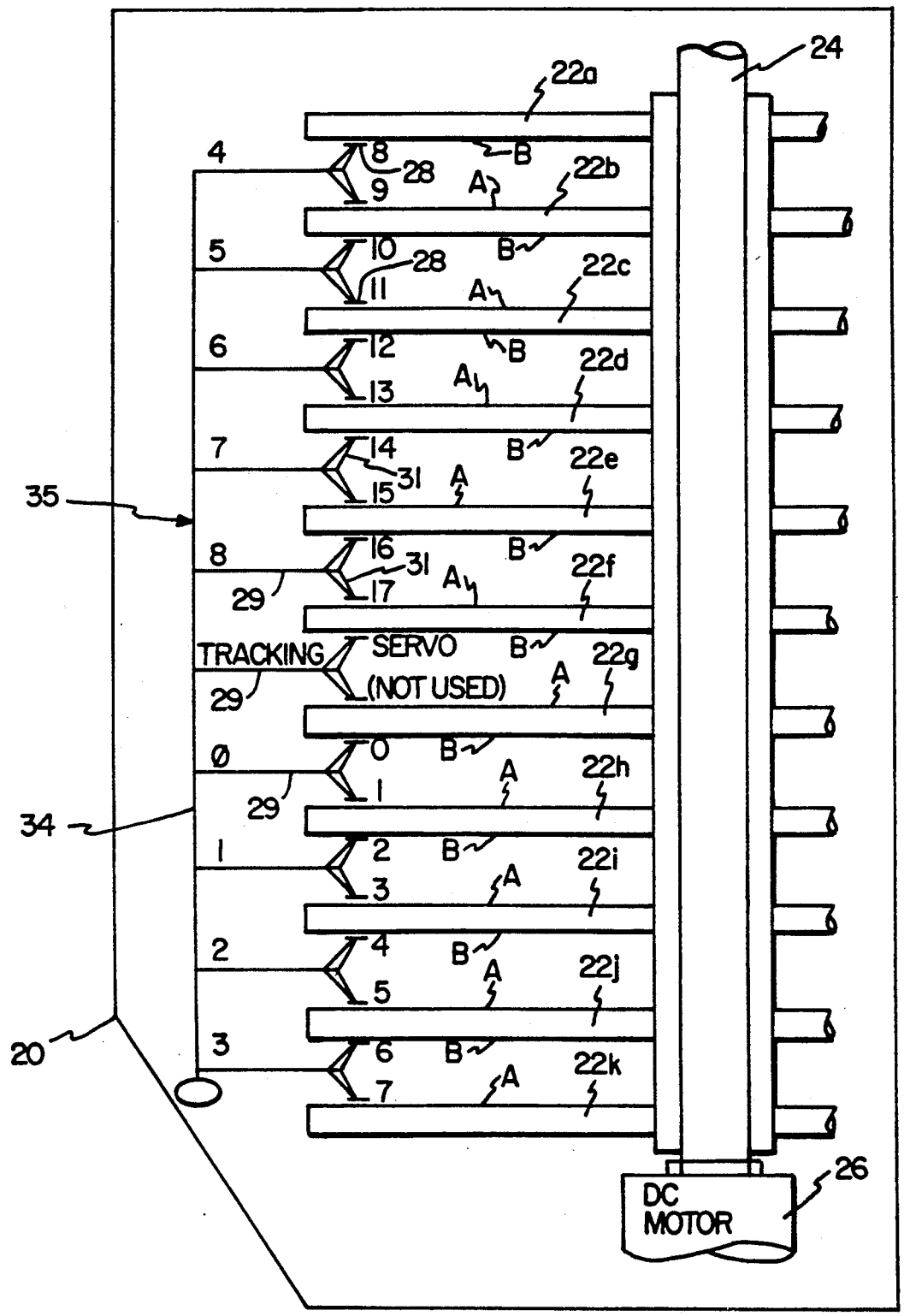
FIG. 2 is a cross-sectional schematic view of a multiple platter parallel transfer disk drive.

FIGS. 1 and 2 illustrate a mass data storage system 10. Mass data storage system 10 is connected by an IPI-2 interface 12 and a data bus 14 to a host data processing system 16 for transferring data between mass storage and the host. An address and control bus 18 is also provided between host 16 and interface 12 for transmitting commands from the host including read commands directing mass data storage system 10 to execute a data recovery operation. Interface 12 is preferably the intelligent peripheral interface "2" (IPI-2) interface for information processing systems magnetic disk drives, established by the American National Standards Institute. The present invention is concerned with data recovery, accordingly the elements of system 10 concerned with reading of data (as opposed to its writing or storage) are illustrated.

Mass data storage system 10 has as its core a multiple platter parallel transfer disk drive 20. Parallel transfer disk drive includes, in the illustrated embodiment, eleven platters 22a-22k mounted on spindle 24. The assembly of spindle 24 and platters 22a-22k are spun at a substantially constant angular velocity by drive motor 26. Each of platters platter 22a and the bottommost platter 22k, have accessible top ("A") and bottom ("B") magnetic media surfaces. Platter 22a has only a bottom accessible magnetic media surface B and platter 22k has only a top accessible magnetic media surface A.

A magnetic transducing head 28 is provided for each accessible magnetic media surface. Magnetic transducing heads 28 provide both for altering the magnetic domain states of the media surfaces for storing data records, and for detecting regions of differing magnetic polarization as a preliminary step to decoding data records. Pairs of magnetic transducing heads 28 are oriented in opposite directions from pivot arms 29, each head being juxtaposed one of facing magnetic media surfaces B and A between two adjacent platters 22.

A positioning system 35 is provided for positioning each magnetic transducing head in identical positions over their respective magnetic media surfaces. Each magnetic transducing head 28 is carried by a load arm 31, adjacent pairs of which are attached to pivot arms 29. Pivot arms 29 are connected to a spindle 34 for joint positioning of all magnetic transducing heads 28 in unison.

Joint positioning of magnetic transducing heads 28 makes control over data recovery easier. Data is recorded along concentric circular tracks on the magnetic media surfaces. As described above, bits from a given byte are distributed among platters 22, which permits parallel transfer of the byte and thereby reduces the recovery time of the byte as compared to serial recovery schemes. Control of the recovery operation is enhanced where each bit of a byte is located at the same logical address for the different transducing heads 28. It is simplest to provide that logical addresses are in corresponding physical locations on platters 22. By moving transducing heads 28 in unison, they are brought over corresponding data record tracks of platters 22. Relative movement of a platter 22 and a magnetic transducing head 28 results in generation of a magnetic signal by the transducer related to a data record encountered on the platter. Adjacent pairs of magnetic transducing heads correspond to one of nine channels (0-8) employed for data transfer. During a read operation, the signals from magnetic transducing heads 28 are passed from parallel transfer disk drive 20 over channels 0-8 to the data and clock recovery circuit 30 corresponding to the respective channel. Each clock recovery circuit 30 comprises phase locked oscillators for recovering the clock signal for each of the pair of data records coming in from parallel transfer disk drive. Recovered data is passed from clock recovery circuit 32 to a serializer/deserializer ("Serdes") 32 which operates to time division multiplex the two data signals on each of the respective channels 0-8. Eight channels provide for the transfer of two 8 bit bytes of data. The ninth channel allows transfer of a parity bit of redundant data for each byte.

One of magnetic transducing heads 28 is dedicated to recovery of positioning information and is marked "tracking". Determination of the position of magnetic transducing heads is well understood in the art and forms no part of the present invention. Accordingly, it is not further discussed here.

The output of each serializer/deserializer 32 is monitored by a an N-1 detect circuit 38, also known as a voter circuit. N-1 detect circuit 38 also monitors the output of a clock window signal generator 40. N-1 detect circuit 38 and clock window signal generator 40 cooperate to detect a failure in data recovery on one of channels 0-8, and to initiate a data fill operation into a failing channel.

N-1 detect circuit 38 is connected to each serializer/deserializer circuit 32 by a two way data transmission line. Serializer/deserializer circuits 32 transmit the data stream recovered by the clock recovery circuits 30 to the N-1 detect circuit, which monitors the data stream for the appearance of a synchronization field data pattern associated with each data record. Clock window signal generator 40, which times a maximum period allowed for recovery of the synchronization field data pattern from all of the data and redundant data channels. The duration of the window is a programmable parameter, which is varied depending upon application of the system.

Figure 3:
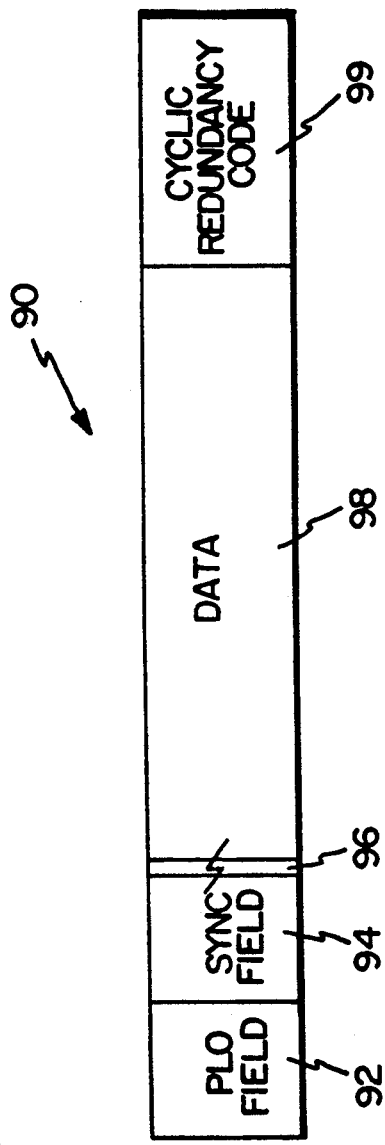
FIG. 3 is an illustration of a format for a data record stored to one of the platters of the disk drive.

FIG. 3 illustrates an exemplary data record 90. Each data record 90 includes a phase locked oscillator (PLO) field 92, a synchronization field 94, a data field 98 and a cyclic redundancy code 99. A splice 96 between the synchronization field 94 and the data field 98 may also be present. A magnetic transducing head executing a read operation will encounter the fields in the order listed. If the read operation functions properly, clock recovery circuit 30 should recover the clock for the data of the data record from the PLO field 92. All synchronization fields 94 contain the same, predetermined data pattern, allowing determination of whether the clock for the record has been successfully obtained. Accordingly, the data pattern for each data record should appear from the output from the serializer/deserializer circuits 32 for each channel within a certain maximum time period.

Returning to FIGS. 1 and 2, N-1 detect circuit 38 retrieves a predetermined pattern from a programmable data fill register 41 and inserts the pattern into the serializer/deserializer 32 upon occurrence of a single failing channel. Data fill is initiated for a channel upon expiration of synchronous field window, absent detection of the synchronization field data pattern for that channel. If the synchronization field data pattern fails to appear on two or more channels, N-1 detect circuit 41 signals interface 12 to abort the read operation. Serializer/deserializer circuits 32 transfer data, including the predetermined data fill pattern in case of a failing channel, in parallel to two bit buffer registers 42. Time division data multiplexor 44 serializes, i.e. reassembles on one channel, the data bytes recovered from magnetic storage 20. The serial data transmission line from multiplexor 44 to interface 12 operates at much higher frequency than would be recovered from a single platter disk drive. The bytes are transferred from multiplexor 44 to a first in first out (FIFO) buffer 46 for transfer upon demand to interface 12.

Data regeneration can proceed upon detection by interface 12 or by host data processing system 16 of the predetermined data fill pattern. Host data processing system 16 or interface 12 can identify the presence and the location of bit locations requiring correction from the predetermined data fill pattern. Either unit can correct the bit values using the remaining data and the parity data. Where host 16 carries out the correction, interface 12 transmits the data onto data bus 14 for use of host data processing system 16 without correction.

The invention allows use of well known parity correction procedures to be extended to parallel transfer drives. This affords the user the capability of continuing data recovery notwithstanding the presence of one bad read channel or a critically located media defect in a parallel transfer drive.

Although the present invention has been described with reference to preferred embodiments, workers skilled in the art will recognize that changes may be made in form and detail without departing from the spirit and scope of the invention.

What is claimed is:

1. A parallel disc drive system having data recovery capabilities, comprising:
   a multi-platter simultaneous parallel transfer disc drive;
   a plurality of data transfer channels, each channel having an associated magnetic transducer and magnetic data storage medium;
   a clock recovery generator connected to each data transfer channel for deriving a clock signal;
   a clock window generator providing a time window within which the clock signal is expected to be recovered;
   a voter circuit connected in parallel to all data transfer channels and to the clock window generator, the voter circuit monitoring both the clock signal derived by the clock recovery generator of each channel and the clock window generator to determine if the clock signal for each channel is recovered within the time window;
   a data fill generator connected in parallel to all data transfer channels and adapted to generate a predetermined data fill pattern independently of information stored on the disc drive and to insert the data fill pattern into a data transfer channel if the clock signal for that channel has not been detected at the expiration of the time window; and
   data regeneration means connected in parallel to all data transfer channels and adapted to recognize the predetermined data fill pattern, and to reconstruct a data stream from a data transfer channel and insert the data stream into the data transfer channel if the predetermined data fill pattern is received from that channel.

2. A data recovery circuit as set forth in claim 1, wherein the voter circuit counts a number of channels for which clock signals are not recovered and signals the parallel transfer disk drive which is performing a read operation to abort the read operation if clock signals for two or more channels are not recovered.

3. A data recovery circuit as set forth in claim 2, wherein data is stored as data records on magnetic storage media, separate data records having original data, as well as redundant data for regeneration of data from a channel which can not be read.

4. A method of recovering data from a multiple platter simultaneous parallel transfer disc drive and outputting the data on a plurality of channels, where at least one channel is associated with each platter, the method comprising the steps of:
   initiating a read operation to read data from the multiple platter parallel transfer disc drive, the read operation having a beginning, a middle and an end;
   attempting to recover clock signals associated with each of a plurality of data records on each platter of the disc drive;
   generating a clock time window associated with the beginning of the read operation;
   monitoring for expiration of the clock time window and for recovery of the clock signals, and giving indication if a clock signal is not received within the time window;
   generating a predetermined data fill pattern independently of data stored on the disc drive to fill the channel for which the clock signal was not recovered within the time window;
   recognizing the predetermined data fill pattern; and
   reconstructing a data stream from a data transfer channel and inserting the data stream into a data transfer channel if the predetermined data fill pattern is received from that channel.

5. A method of recovering data as set forth in claim 4, the method comprising the additional step of: aborting the recovery of data if two or more clock signals are not recovered within the time window.

6. A data recovery system in a multiple platter parallel transfer disc drive, wherein at least one data transfer channel is associated with each platter, the system comprising:
   a multiple platter simultaneous parallel transfer disc drive:
   means connected in parallel to all data transfer channels in the parallel transfer disc drive for initiating a read operation, the read operation having a beginning, a middle, and an end;
   means connected to each data transfer channel for recovering clock signals associated with each of a plurality of data records on each platter of the disc drive;

means connected to each data transfer channel for generating a clock time window associated with the beginning of the read operation;

means for monitoring the clock time window and the recovery of the clock signals, and giving indication if a clock signal for a channel is not received within the clock time window; and means connected in parallel to all data transfer channels for filling the channel for which the clock signal was not recovered within the clock time window with a predetermined data pattern; and data regeneration means connected in parallel to all data transfer channels and adapted to recognize the predetermined data fill pattern, the predetermined data fill pattern being created independently of information stored on the disc drive, and to reconstruct a data stream from a data transfer channel and insert the data stream into a data transfer channel if the predetermined data fill pattern is received from that channel.

7. A system as set forth in claim 6, and further comprising:

means for aborting the read operation if two or more clock signals are not recovered within the clock time window.

* * * * *